Jan. 28, 1969    A. C. NEADERLAND    3,425,028
CLAMP CONNECTOR
Filed June 17, 1966

INVENTOR
ADOLPH C. NEADERLAND
BY
ATTORNEY

United States Patent Office 3,425,028
Patented Jan. 28, 1969

3,425,028
CLAMP CONNECTOR
Adolph Neaderland, Norwalk, Conn., assignor to Burndy Corporation, a corporation of New York
Filed June 17, 1966, Ser. No. 558,480
U.S. Cl. 339—249                7 Claims
Int. Cl. H01r 13/24, 3/02, 11/20

ABSTRACT OF THE DISCLOSURE

A connector clamp for joining a plurality of cables having a U-shaped connector body. A spacer positioned between the legs of the U-shaped body. The spacer and the legs of the body each having cable engaging seats to hold a cable between a leg of the body and a side of the spacer. The body has means adjacent its bight to receive bolt means to clamp the free ends of the body about the cables. The spacer has an extension which is perforated to allow the bolt means to extend therethrough for aligning the spacer with respect to the U-shaped connector body.

---

This invention relates to electrical connectors and more particularly to a connector for clamping a plurality of electrical cables together.

Ordinarily, such connectors are made of cast or forged body parts which are heavy in weight, expensive to manufacture, and difficult to transport.

Accordingly, it is an object of the present invention to provide a lightweight clamp connector.

Further objects are to provide a lightweight clamp connector that may be manufactured by stamping, that possesses a range-taking ability, that may be installed with standard tools, and that is relatively inexpensive to fabricate.

These and other objects, features, advantages and new results are obtained with the invention which is described in the following specification, particularly pointed out in the claims, and illustrated in the accompanying drawing, in which:

Figure 1:
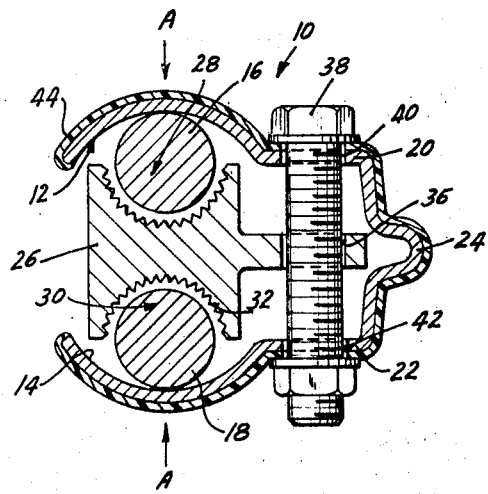
FIG. 1 is a transverse sectional view taken through a connector formed in accordance with this invention shown prior to clamping.

Referring now in greater detail to the drawing, reference numeral 10 designates generally a sheet metal connector body, which in its flat initial form may be a rectangular blank. It is subsequently folded and formed into substantially U-shaped, having oppositely positioned cable seats 12 and 14 formed at the free ends thereof, for receiving a pair of cables such as 16 and 18 respectively. The body further includes a pair of oppositely positioned bolt-engaging sections 20 and 22, which are joined together at the connecting bend 24.

In a preferable embodiment, a spacer 26 having cable seats 28 and 30 respectively is positioned between the cables. The seats may be serrated as at 32. An extension 34 extends laterally from the main body of the spacer, and is slotted to provide an opening as at 36 to receive the clamping bolts 38. The bolt engaging sections 20 and 22 of the connector body 10 are similarly apertured, as at 40 and 42, for clamping bolts 38. Thus, the spacer may be secured in position, forming a unitary connector assembly comprising the spacer, bolts, and sheet metal clamping body.

During installation of this connector, the two clamping seats may be spread apart to the desired degree upon proper positioning of the bolt and nut as shown in FIG. 1. When the cables are inserted the bolt is tightened, as shown in FIG. 2, until the cables are clamped between the spacer and the sheet metal body with pressure being applied to the cables in the direction of the arrows A—A.

Figure 2:
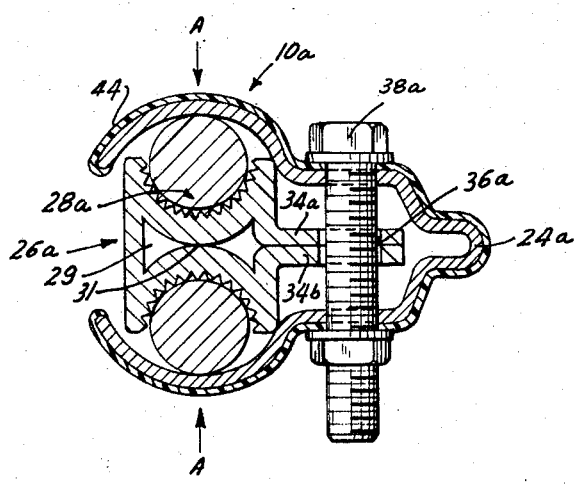
FIG. 2 is a similar view showing a sheet metal spacer with the clamping bolt in tightened position.

FIG. 2 illustrates a sheet metal spacer 26a which further carries out the objective of reducing the overall weight of the complete connector. This sheet metal spacer may be made by folding a metal blank to the illustrated shape, with the two flat ends 34a and 34b forming the spacer extension which is perforated as at 36a. The body section of the spacer is shaped into seats 28a and 30a, thereby forming a hollow section 29 which effectively limits the overall weight of this element.

The bottoms of the two seats may abut each other, as at 31, in the hollow section in order to firmly position them with respect to each other.

Figure 3:
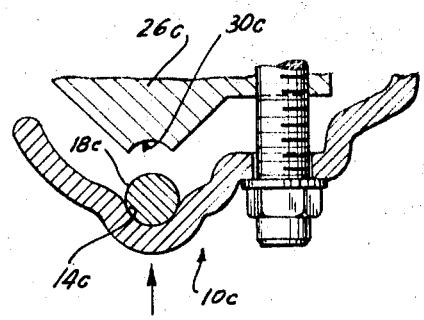
FIG. 3 is a fragmentary sectional view showing a spacer adapted for use with a small size cable.
Figure 4:
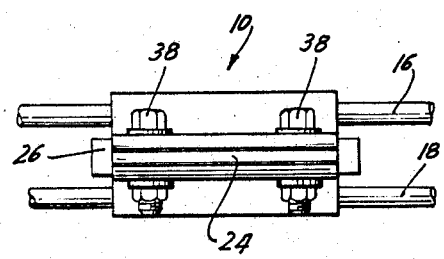
FIG. 4 is a side elevation view of a clamped connection formed in accordance with this invention.

FIG. 3 illustrates a modification 10c in which the sheet metal connector body is provided with a supple metal seat 14c having a reduced diameter portion for seating a cable 18c of minimum size. The spacer 26c may be provided with a corresponding seat 30c to accommodate the smaller size cable.

The illustrated construction of this invention readily lends itself to insulation coverings. FIGS. 1 and 2 illustrate an insulation cover 44, which may be attached by an adhesive or by other bonding techniques to the outside surface of the clamp connector, where such insulation is desired. The rubber or plastic insulating material may be laminated to flat sheet stock from which an insulated connector body may then be formed in a single operation.

The sheet metal body and spacer may be formed of copper or aluminum, depending on the cables to be secured thereby. The material selected should preferably be springy in nature so that the sheet metal body will be self-opening when the bolts are released. This particular advantage clearly is not possible with the forged or cast connectors commonly used in the prior art.

We have thus described our invention, but we desire it understood that it is not confined to the particular forms or uses shown and described, the same being merely illustrative, and that the invention may be carried out in other ways without departing from the spirit of our invention, and therefore, we claim broadly the right to employ all equivalent instrumentalities coming within the scope of the appended claims, and by means of which objects of our invention are attained and new results accomplished, as it is obvious that the particular embodiments herein shown and described are only some of the many that can be employed to attain these objects and accomplish these results.

I claim:

1. A connector clamp for joining a plurality of cables, which comprises a U-shaped sheet metal connector body the free ends of which are curved into cable engaging seats, a pair of bolt-engaging surfaces positioned between the free ends and the bight of the U-shaped body; and bolts for clamping the free ends about the cables, U-shaped connector body being made of material capable of flexing sufficiently to permit the free end to open for inserting the cables therebetween; and a spacer having oppositely positioned cable seats corresponding to the cable seats of the connector body, said spacer is made of a sheet of metal, said sheet being folded back on itself with its two ends abutting to form an integral spacer extension, said spacer seats being adjacent the fold and positioned between the cable seats of the connector body, the extension positioned between the bolt-engaging surfaces, said extension perforated to allow the bolts to extend therethrough for aligning the spacer with respect to the connector body.

2. The connector clamp of claim 1, wherein the bolt engaging surfaces are flat.

3. The connector clamp of claim 1, wherein the U-shaped connector body has an insulation covering on its outside surface.

4. The connector clamp of claim 3, wherein said insulation covering is laminated to said outside surface.

5. A connector clamp for joining a plurality of cables, which comprises a U-shaped sheet metal connector body the free ends of which are curved into cable engaging seats, a pair of bolt-engaging surfaces positioned between the free ends and the bight of the U-shaped body; and bolts for clamping the free ends about the cables, the U-shaped connector body being made of material capable of flexing sufficiently to permit the free end to open for inserting the cables therebetween; and a hollow spacer having oppositely positioned cable seats corresponding to the cable seats of the connector body, inside portions of the spacer seats engaging each other to maintain the spacer seats in spaced position, said spacer positioned between the cable seats of the connector body, said spacer formed with an integral extension positioned between the bolt-engaging surfaces, said extension perforated to allow the bolts to extend therethrough for aligning the spacer with respect to the connector body.

6. A method of making a spacer for a cable clamp which comprises stamping a flat sheet of metal; folding the stamping on itself; shaping the stamping into a hollow spacer body; forming two oppositely positioned cable seats near one end of the spacer; and abutting two extending flat ends of the stamping to each other to form an integral flat extension.

7. The method of claim 6, wherein during the stamping operation an opening is stamped from the sheet metal to form bolt openings for the flat extension.

References Cited

UNITED STATES PATENTS

| 832,876 | 10/1906 | Peirce | 339—248 |
|---|---|---|---|
| 1,122,028 | 12/1914 | Parker | 339—266 X |
| 2,426,857 | 9/1947 | Birkenmaier. | |
| 2,573,710 | 11/1951 | Holke. | |
| 2,771,591 | 11/1956 | Vordtriede | 339—265 X |
| 2,845,606 | 7/1958 | Fuller. | |
| 2,948,878 | 8/1960 | Toedtman | 339—265 |
| 3,048,650 | 8/1962 | Allen et al. | |
| 3,177,542 | 4/1965 | James | 24—125 |
| 3,218,602 | 11/1965 | Morse | 339—266 X |
| 3,329,928 | 7/1967 | Broske | 339—247 |

MARVIN A. CHAMPION, *Primary Examiner.*

PERRY TEITELBAUM, *Assistant Examiner.*

U.S. Cl. X.R.

339—266, 278, 95; 24—125; 29—629